United States Patent [19]

Wright

[11] 4,032,937
[45] June 28, 1977

[54] FILM UNIT LIGHT SHIELDING ADAPTER FOR PHOTOGRAPHIC APPARATUS

[75] Inventor: Joseph H. Wright, Marblehead, Mass.

[73] Assignee: Polaroid Corporation, Cambridge, Mass.

[22] Filed: Sept. 10, 1975

[21] Appl. No.: 612,209

[52] U.S. Cl. .................................. 354/86; 354/277
[51] Int. Cl.² .................. G03B 17/50; G03B 17/26
[58] Field of Search ............. 354/202, 75, 87, 277, 354/288, 182, 186, 354, 275, 276, 307, 85, 86, 187

[56] References Cited

UNITED STATES PATENTS

| 917,136 | 4/1909 | Robertson | 354/277 X |
|---|---|---|---|
| 985,581 | 2/1911 | Goddard | 354/277 |
| 1,113,568 | 10/1914 | Mandel | 354/182 |
| 2,451,820 | 10/1948 | Garrett | 354/86 |
| 2,467,320 | 4/1949 | Land | 354/85 |
| 2,572,357 | 10/1951 | Land | 354/86 |
| 2,648,265 | 8/1953 | Candela | 354/277 |
| 2,873,658 | 2/1959 | Land | 354/86 |
| 3,650,188 | 3/1972 | Whall | 354/187 |
| 3,748,990 | 7/1973 | Erlichman | 354/186 |
| 3,810,211 | 5/1974 | Wareham et al. | 354/86 |

Primary Examiner—Donald A. Griffin
Attorney, Agent, or Firm—John S. Vale

[57] ABSTRACT

A thin dark chamber or light shielding adapter that is configured to be slidably inserted through a narrow film exit slot in a self-developing camera for receiving and light shielding self-developing film units of the type requiring a short imbibition period in a light-free environment subsequent to the distribution of a processing composition between predetermined layers of the film unit.

15 Claims, 9 Drawing Figures

FILM UNIT LIGHT SHIELDING ADAPTER FOR PHOTOGRAPHIC APPARATUS

BACKGROUND OF THE INVENTION

1. Field of the Invention

The present invention relates to photography and, more particularly, to a camera accessory for light shielding a film unit that has been advanced through a film exit slot in the camera and at least partially extends outside of the camera housing.

2. Description of the Prior Art

The SX-70 Land Camera, marketed by Polaroid Corporation, Cambridge, Mass., is a highly automated, folding, self-developing camera which exposes and processes "integral type" self-developing film units.

One type of integral film unit which may be used in the SX-70 camera is disclosed in U.S. Pat. No. 3,647,437. The film unit provides a reflection print and includes a self-contained opacification system in the fluid processing composition which allows the film unit to be advanced, through a film exit slot in the camera, directly into the ambient illumination without causing further exposure of the photosensitive materials within the film unit.

Other integral type of self-developing film units have been proposed which either do not include a self-contained opacification system or includes an opacification for only one side of the photosensitive emulsion. Such film units (either reflection print or transparencies) must therefore be maintained in a light-free environment for a short imbibition period for, following distribution of a fluid processing composition within the film unit to prevent further exposure or fogging.

The present invention is directed to an accessory which may be readily attached to a commercially available SX-70 for providing a light-free environment when integraltype film units requiring the same are used therewith.

Without the addition of an accessory dark chamber or film unit light shield thereto, commercially available SX-70 cameras are adapted to expose and process self-developing film units which include a self-contained opacification system.

Subsequent to exposure, such a film unit is advanced between a pair of camera mounted pressure-applying rollers which rupture a pod or container on the film unit holding a fluid processing composition and distribute the fluid between a predetermined pair of layers of the film unit to initiate a development and diffusion transfer process.

Extending forwardly of the rollers is a camera housing section having a film exit slot in a bottom wall portion thereof. Intermediate the exit slot and the exit side of the rollers is a baffle or plate which is pivotally mounted on the bottom walls of the housing section, adjacent the exit slot, and is movable between a folded position wherein the plate is located in substantially parallel overlying relationship to the interior surface of the bottom wall and a normal extended position wherein the plate is inclined at approximately a 45-° angle to the bottom wall and cooperates with side walls of the housing section and another camera housing section extending forwardly over the top of the rollers to form a lighttight chamber between the exit side of the rollers and the film exit slot. The length of the chamber is shorter than the length of the film unit.

In operation, the film unit advances through the pair of rollers and the leading edge of the film unit engages the erected baffle which deflects or gently bends the film unit from its normal path of travel and guides it to the film exit slot in the bottom wall where it emerges from the camera.

The baffle serves two functions. First, it provides a light-free environment between the rollers and film exit slot so that light rays may not impinge a transparent exposure and viewing "window" of the film unit and be transmitted, within the confines of a transparent sheet forming the window, rearwardly to that portion of the film unit on the entrance side of the rollers that has not as yet been covered by the processing fluid having the opacification system therein. The second function of the baffle relates to improving the uniformity of fluid distribution within the film unit. It has been found that by inducing a gentle bend in the film unit as it emerges from the rollers, substantial improvement in reliably obtaining uniform and complete coverage of the photoexposed area of the film unit is achieved.

For a more detailed explanation of the construction and operation of the baffle, reference may be had to U.S. Pat. No. 3,810,211.

When the trailing end of the film unit has passed through the rollers, approximately one half of the image forming area of the film unit extends outside of the camera beyond the film exit slot. The film unit may be removed immediately however since it is protected from further exposure by the opacification system in the processing fluid.

The relatively short dark chamber extending between the pressure-applying rollers and the film exit slot is not adequate however to protect film units which do not include a self-container light opacification system (including reflection print and transparency film units) because the entire photosensitive or image-forming area of the film unit will not fit into the chamber.

The prior art is replete with self-developing cameras that include full length dark chambers or light shields in front of the pressure-applying rollers and/or film exit slots for receiving self-developing film units of the type which require a short imbibition period in a light-free environment subsequent to the distribution of the fluid processing composition.

Representative examples of such prior art may be found in U.S. Pat. Nos. 2,451,820; 2,467,320; 2,616,804; 3,369,469; 3,650,188; 3,678,830; and 3,748,990. Also see patent applications Ser. Nos. 466,371, (now U.S. Pat. No. 3,940,774) and 466,414 (now U.S. Pat. No. 3,938,167) filed May 2, 1974, Ser. No. 569,761, filed April 21, 1975 and Ser. No. 569,751 filed April 21, 1975 and now abandoned and replaced by copending continuing application Ser. No. 679,048 filed Apr. 21, 1976.

The dark chambers disclosed in the above patents and applications take a variety of forms. Some are rigid. Others fold or are extensible and retractable. Some of the chambers are permanently mounted on the camera housing, others are in the form of an accessory that is adapted to be detachably mounted on the camera.

All of the above have one common characteristic however. The camera and dark chamber have corresponding means thereon for operatively mounting the dark chamber on the camera.

Copending application Ser. No. 569,751, filed on Apr. 21, 1975 (and now abandoned and replaced by copending continuing application Ser. No. 679,048 filed Apr. 21, 1976), is directed to a dark chamber accessory that is adapted to be mounted on an SX-70 camera without having to make any modifications to the camera even though commercially available SX-70 cameras do not have specifically designed dark chamber mounting or coupling means thereon.

The dark chamber accessory is designed to fit into the forward housing section of the SX-70 camera in front of the pressure-applying rollers. To accommodate the accessory however the baffle plate is deflected to its folded position and blocks the film exit slot. Therefore, the existing baffle plate and film exit slot are not used and functional equivalents of these two camera elements must be built into the dark chamber accessory. This in turn causes the dark chamber accessory to be rather bulky which may provide the user with a mirror inconvenience in carrying or storing the adapter when it is not attached to the camera.

SUMMARY OF THE INVENTION

The present invention provides an accessory adapter in the form of a dark chamber or a light shield for receiving and protecting those types of integral self-developing film units which require a short imbibition period in a light-free environment following the distribution of the fluid processing composition between predetermined layers of the film unit.

A preferred embodiment of the adapter is designed to be releasably coupled to a commercially available SX-70 camera without any modification whatsoever thereto.

As noted earlier, the SX-70 camera includes a forward housing section which mounts a pair of pressure applying-rollers, has a narrow film exit slot at the forward end of the housing section and also includes an inclined baffle plate between the exit slot and the film exit side of the rollers.

The forward housing section is pivotally coupled to a rear housing section for movement between a closed operative position wherein it is aligned with the rear section and an open inoperative position wherein the forward section is spaced from the rear section to permit the loading of a film container into a receiving chamber in the rear section.

When the forward section is opened, the user has access, between the rollers and the upper edge of the baffle plate, to the interior side of the film exit slot.

In a preferred embodiment of the adapter, it is formed as a thin rigid lighttight envelope that may be slidably inserted through the film exit slot from the interior side thereof such that part of the envelope extends outwardly from the forward housing section beyond the film exit slot. In effect, it forms an extension of the short dark chamber on the forward housing section so that the entire film unit may be protected.

The trailing end of the adapter includes a section thereon that is adapted to releasably engage the top edge of the baffle plate for releasably coupling the adapter to the camera and for accurately positioning a film guiding surface of the adapter with respect to the predetermined path of travel of the film unit.

The lighttight envelope is just slightly larger than the film unit itself. For example, a typical film unit is approximately 4.25 inches long, 3.50 inches wide and 0.035 inches thick (outside dimensions). The envelope is just slightly longer and wider and has an interior passageway of approximately 0.040 inches and a total thickness of approximately 0.075 inches. Because the envelope is so thin, it may be readily inserted through the film exit slot without causing any permanent deformation thereto.

Being relatively thin, the adapter may be easily carrier and stored and tends to be more convenient for the user than the adapters disclosed in the previously mentioned application Ser. No. 569,751.

Since it needs no special coupling structure on the camera (unlike of the dark chambers disclosed in the above-mentioned patents) it may be readily attached to existing SX-70 cameras.

Also, being insertable from the interior side of the film exit slot ensures that the adapter will not be accidently knocked off or inadvertently fall off the camera.

Therefore, it is an object of the invention to provide an adapter for expanding the versatility of an SX-70 camera by allowing the use therein of film units (such as transparencies) that would not be protected by the relatively short dark chamber on commercially available cameras.

It is another object to provide a thin elongated rigid light-shielding adapter which may be easily coupled to and detached from the camera and is convenient to use, store and carry.

It is yet another of the invention to provide a light-shielding adapter for film units requiring a short inhibition period in a light-free environment which may be readily and securely attached to a commercially available SX-70 camera without having to make any modification to the same.

Other objects of the invention will in part be obvious and will in part appear hereinafter.

BRIEF DESCRIPTION OF THE DRAWINGS

For a fuller understanding of the nature and objects of the invention, reference should be had to the following detailed description taken in connection with the accompanying drawings wherein.

DESCRIPTION OF THE PREFERRED EMBODIMENT

Figure 1:
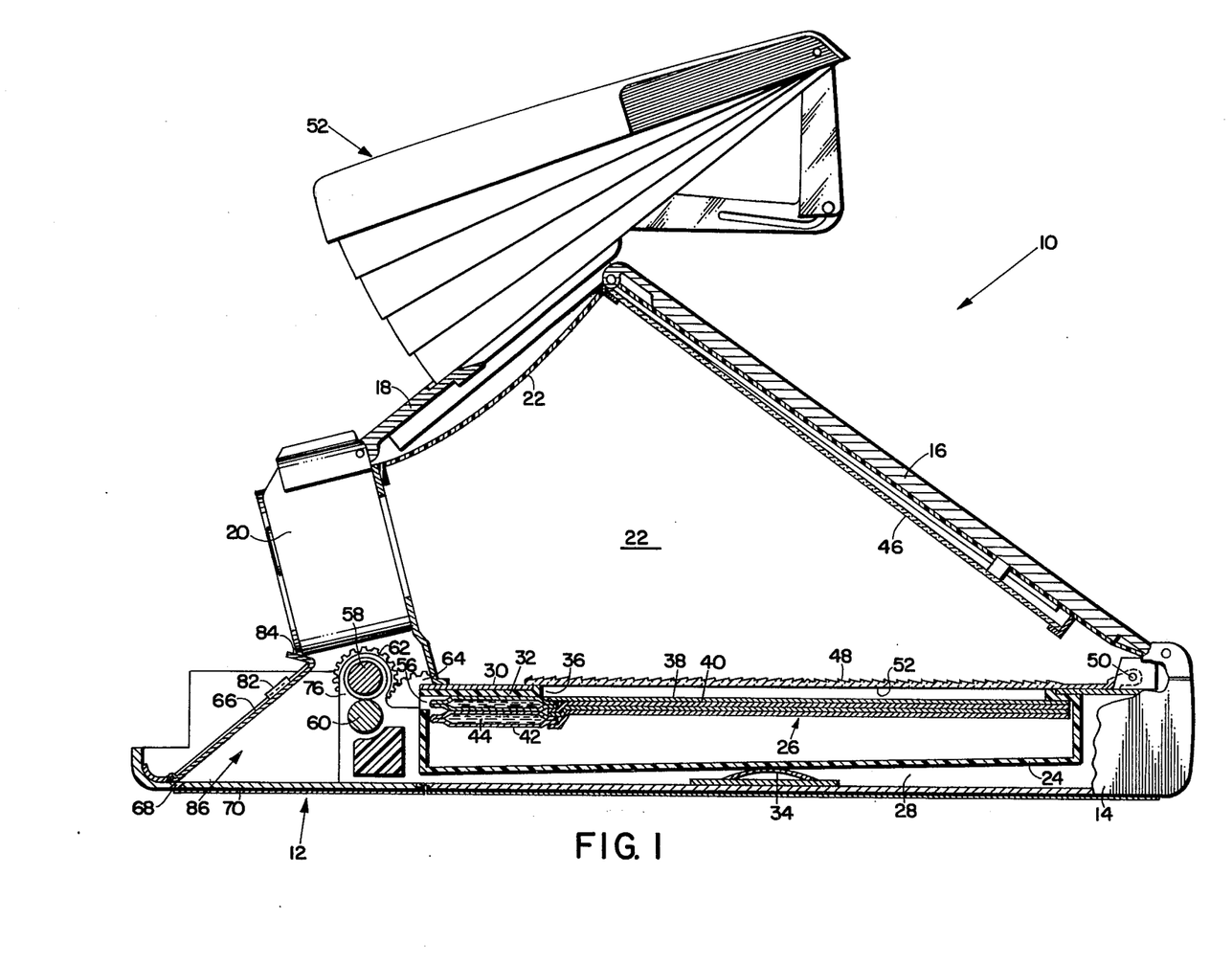
FIG. 1 is a side elevational view, partly in section, of a self-developing camera that is representative of a commercially available SX-70 Land Camera.
Figure 3:
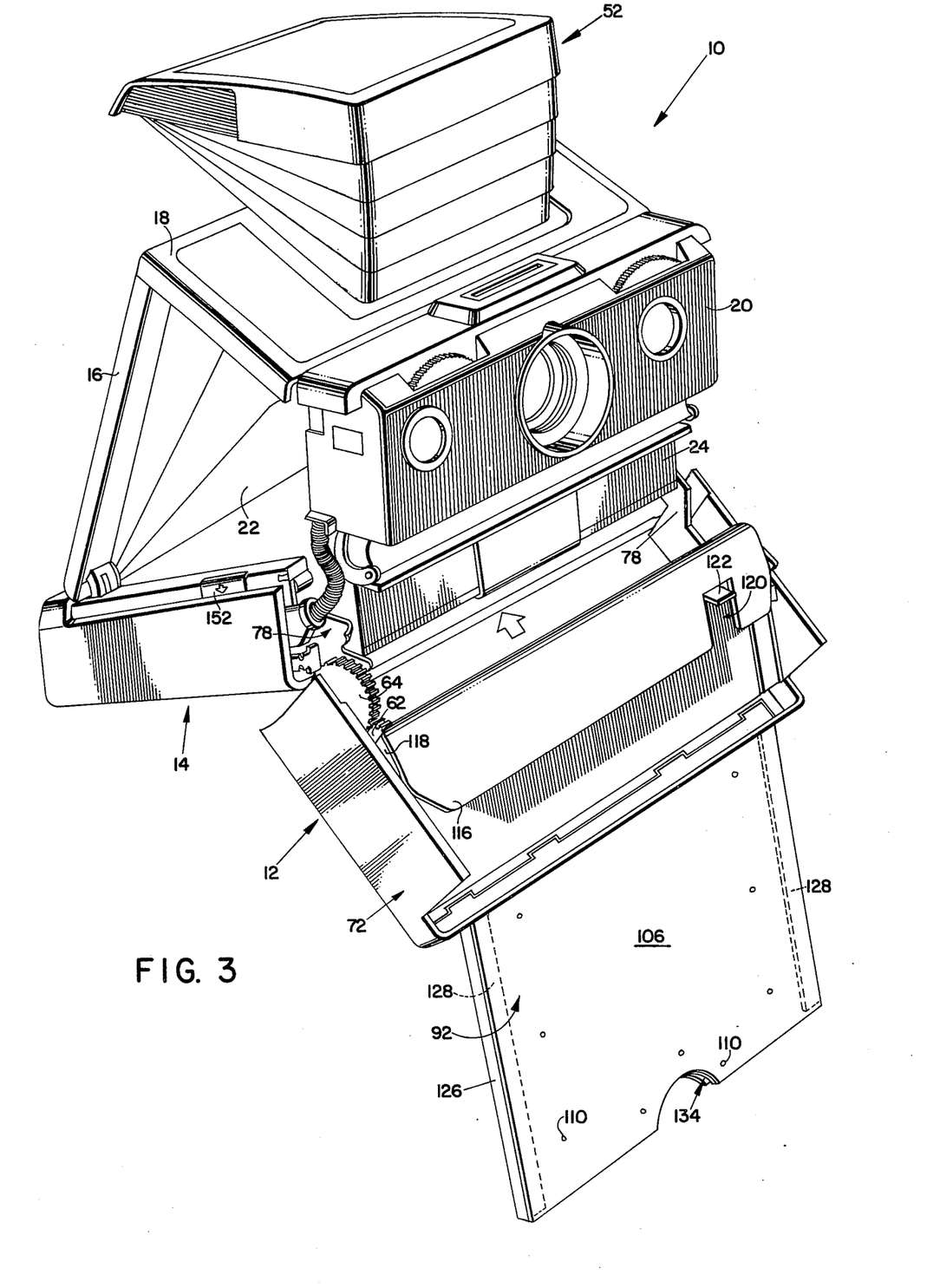
FIG. 3 is a perspective view of the camera of FIG. 1 and the adapter of FIG. 2 showing the forward housing section of the camera in an open position and the adapter releasably mounted thereon.
Figure 4:
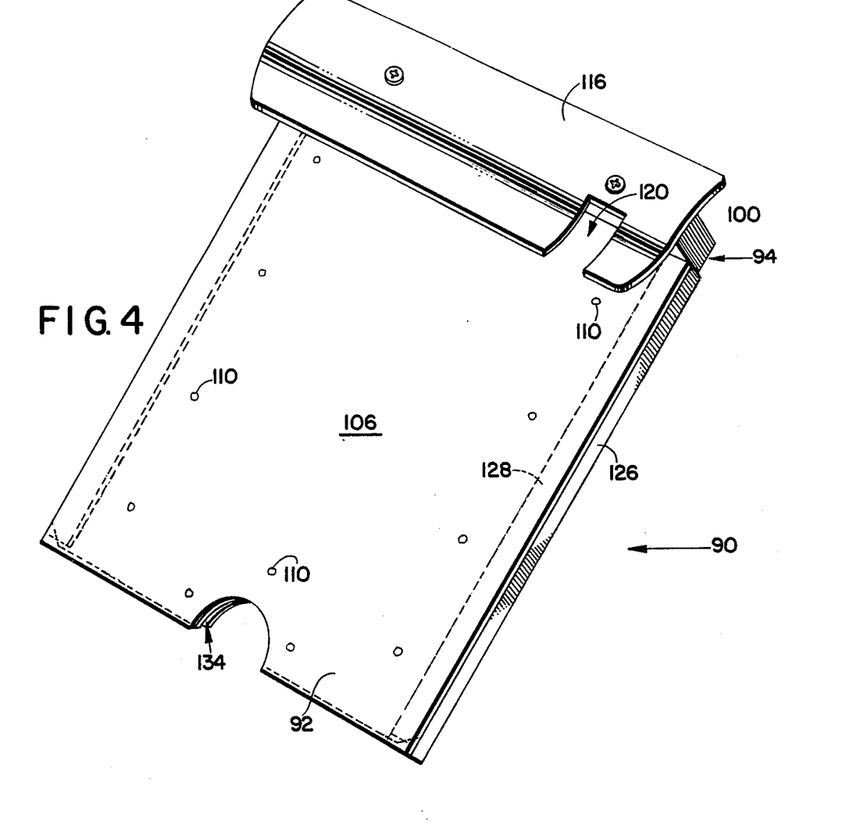
FIG. 4 is a perspective view of the adapter embodying the present invention.
Figure 5:
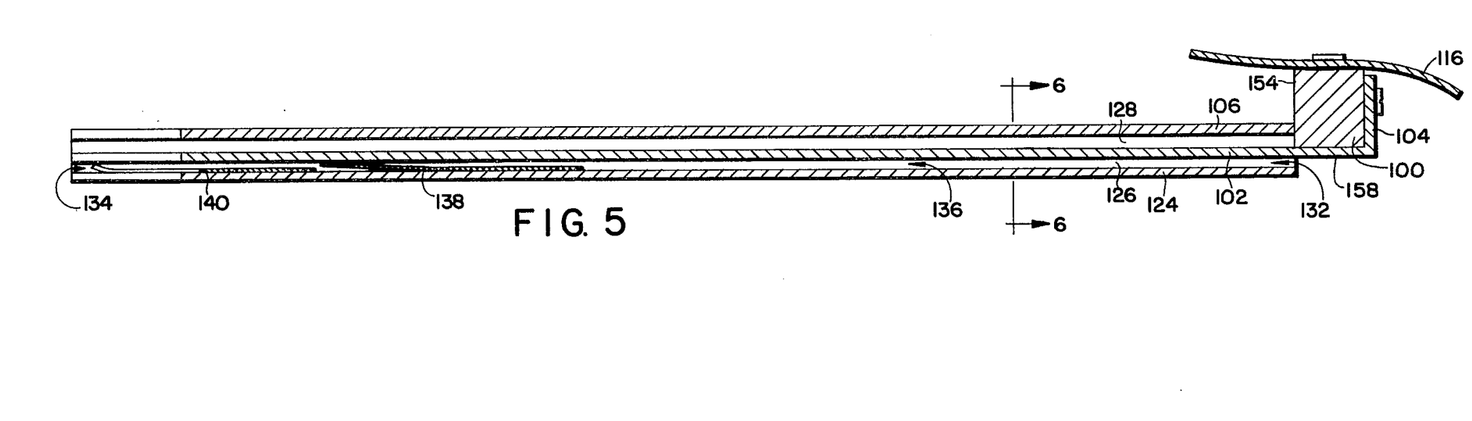
FIG. 5 is a side sectional view of the adapter of FIG. 4.

FIGS. 1 and 3 of the drawings show a compact, folding, highly automated, single lens reflex, self-developing camera 10 that is representative of the SX-70 Land Camera marketed by the Polaroid Corporation, Cambridge, Mass.

Camera 10 is formed by a plurality of interconnected housing sections 12, 14, 16, 18 and 20 and a light excluding bellows 22 and is movable between the erected position shown in FIG. 1 and a compact folded position.

Housing section 12 is pivotally coupled to the open leading end of housing section 14 and may be pivoted downwardly (counterclockwise as viewed in FIG. 1) for loading a film container 24, holding a plurality of integral type self-developing film units 26, into a receiving chamber 28 within housing section 14.

Receiving chamber 28 includes an apertured plate 30 therein against which a forward wall 32 of the film container 24 is urged by a spring 34 to locate the forwardmost film unit 26 in container 24 at the camera exposure plane for exposure by image bearing light transmitted through an exposure aperture 36 in wall 32 of container 24.

The film unit 26 is diagrammatically illustrated in FIG. 1 as including a pair of superposed sheet-like elements 38 and 40 and a rupturable container 42, holding a supply of fluid processing composition 44 therein, attached to one end of elements 38 and 40.

In actuality, film unit 26 is a multi-layer structure having a plurality of photosensitive layers and one or more image receiving layers. For a detailed description of a typical integral type of self-developing film unit see U.S. Pat. No. 3,647,437.

The illustrated camera 10 operates first in a viewing and focusing mode followed by a film exposure and processing mode.

Scene light passes through the objective lens in housing section 20, across an internal chamber defined by bellows 22, to an inclined mirror 46 on the interior surface of housing section 16. From mirror 46 the light is reflected downwardly to a viewing screen 48 on the upper side of a pivotally mounted (at pin 50) reflex member located in covering relation to the aperture in plate 30. An image of the scene to be photographed is formed on screen 48 which is reflective in nature. Light rays from the image on screen 48 are directed to mirror 46 and are reflected therefrom to a viewing device 52 on housing section 18.

Camera 10 is battery energized and includes electronic circuits, a motor, drive train, and other elements not shown for carrying out the following sequence of operations.

In response to actuating a camera cycle start button, a normally open shutter in housing section 20 closes; the reflex member pivots in a clockwise direction, about pin 50, to position a mirror 54 on the underside thereof in front of mirror 46. The shutter reopens for film exposure, via reflection from mirror 54, and is terminated by a light sensing circuit. The exposed film unit 26 is engaged by a film advancing device (not shown) and is advanced through a slot 56 in the forward end of film container 24 and into the bite between a pair of juxtaposed cylindrical pressure applying rollers 58 and 60 mounted on housing section 12. The top roller 58 has a gear 62 on one end thereof which is in mesh with a roller drive gear 64 for driving the top roller 62 to cause film unit 26 to be advanced between rollers 58 and 60. As the film unit is advanced between the rollers, fluid container 42 is ruptured and the fluid 44 is progressively distributed between a predetermined pair of layers of the film unit represented by the interface between film elements 38 and 40. The leading edge of film unit 26 engages an inclined baffle plate 66 on housing section 12 and is deflected or gently bent from its normal path of travel from the exit side of the rollers and is guided to a film exit slot 68 in a bottom wall 70 of camera housing section 12. When the trailing end of the film unit clears rollers 58 and 60, approximately one half of the film unit 26 extends out of camera 10 through slot 68.

During the film processing phase, the reflex member is returned to the viewing position, the shutter reopens, and various camera mechanisms are reset for the next cycle of operation.

For a more detailed explanation of the operating cycle of camera 10, reference may be had to U.S. Pat. No. 3,774,516.

Figure 2:
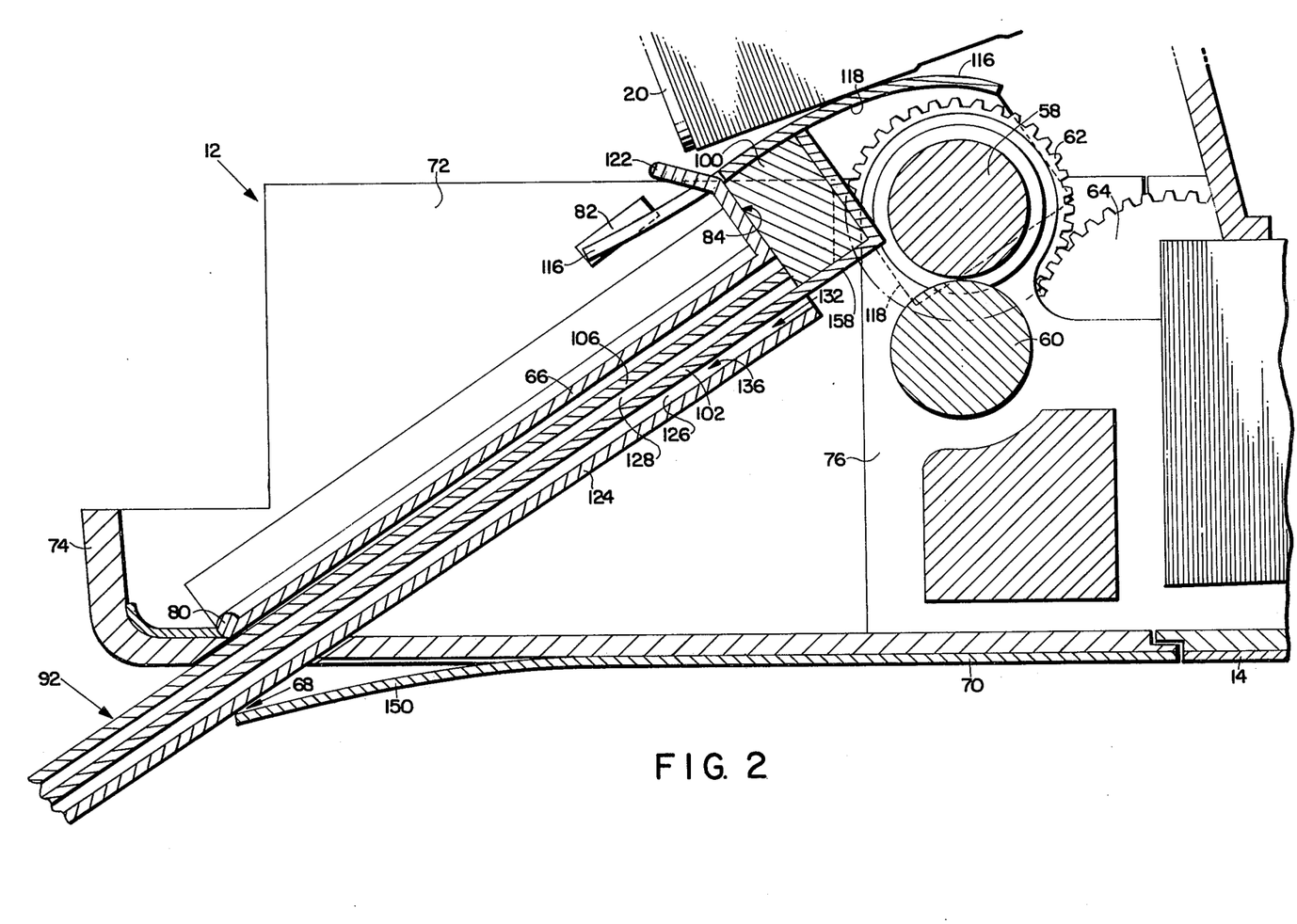
FIG. 2 is a side elevational view, partly in section, of the leading end of the camera shown in FIG. 1 and a portion of a film unit light-shielding adapter, embodying the present invention, releasably coupled to the camera.

As best shown in FIGS. 1, 2 and 3, the camera housing section 12 includes a generally planar bottom wall 70, a pair of upstanding lateral sidewalls 72 and a short upturned leading end wall section 74.

The rollers 58 and 60 are rotatably mounted on a roller bracket assembly 76 which is in turn positioned between the lateral sidewalls 72 and is securely fastened to bottom wall 70. A pair of rearwardly extending bracket arms 78 are provided for pivotally connecting the roller mounting bracket 76 (and housing section 12 coupled thereto) to complementary structure (not shown) at the leading end of housing section 14. The roller drive gears 62 and 64 are located outboard of the left hand (as viewed in FIG. 3) side of the bracket assembly 76 and gear 64 is adapted to mesh with a gear at the leading end of a drive train in housing section 14.

The light opaque baffle plate 66 extends between side wals 72 and is pivotally coupled to the bottom wall 70 at 80 for movement between the extended position of FIG. 1 and the folded position.

Baffle plate 66 is biased towards its extended position by a spring (not shown) and a pair of inwardly extending tabs or stops 82 on the interior surfaces of walls 72 limit its upward movement and locate baffle 66 in the operative position. When so located, baffle 66 is at an inclined angle of approximately 45° with respect to bottom wall 70 and a top edge 84 thereof abuts the under side of camera housing section 20 which extends forwardly over the top of the upper roller 58. When camera 10 is folded, housing section 20 pivots into the forward end of housing section 12 and depresses baffle plate 66 to its folded position. When the camera is erected, plate 66 automatically moves to the extended position under the influence of the biasing spring.

When erected plate 66 cooperates with bottom wall 70, side walls 72 and the underside of camera housing section 20 to form a dark chamber 86 between the exit side of the rollers 58 and 60 and the film exit slot 68. Plate 66 is also effective to block the passage of light around and between rollers 58 and 60 thereby protecting the forwardmost film unit from fogging.

As noted earlier, the length of dark chamber 86 is insufficient to receive the full length of the film unit 26. When the trailing end of the film unit 26 has cleared the rollers, half of the film unit extends outside of the camera 10.

Figures 8, 9:
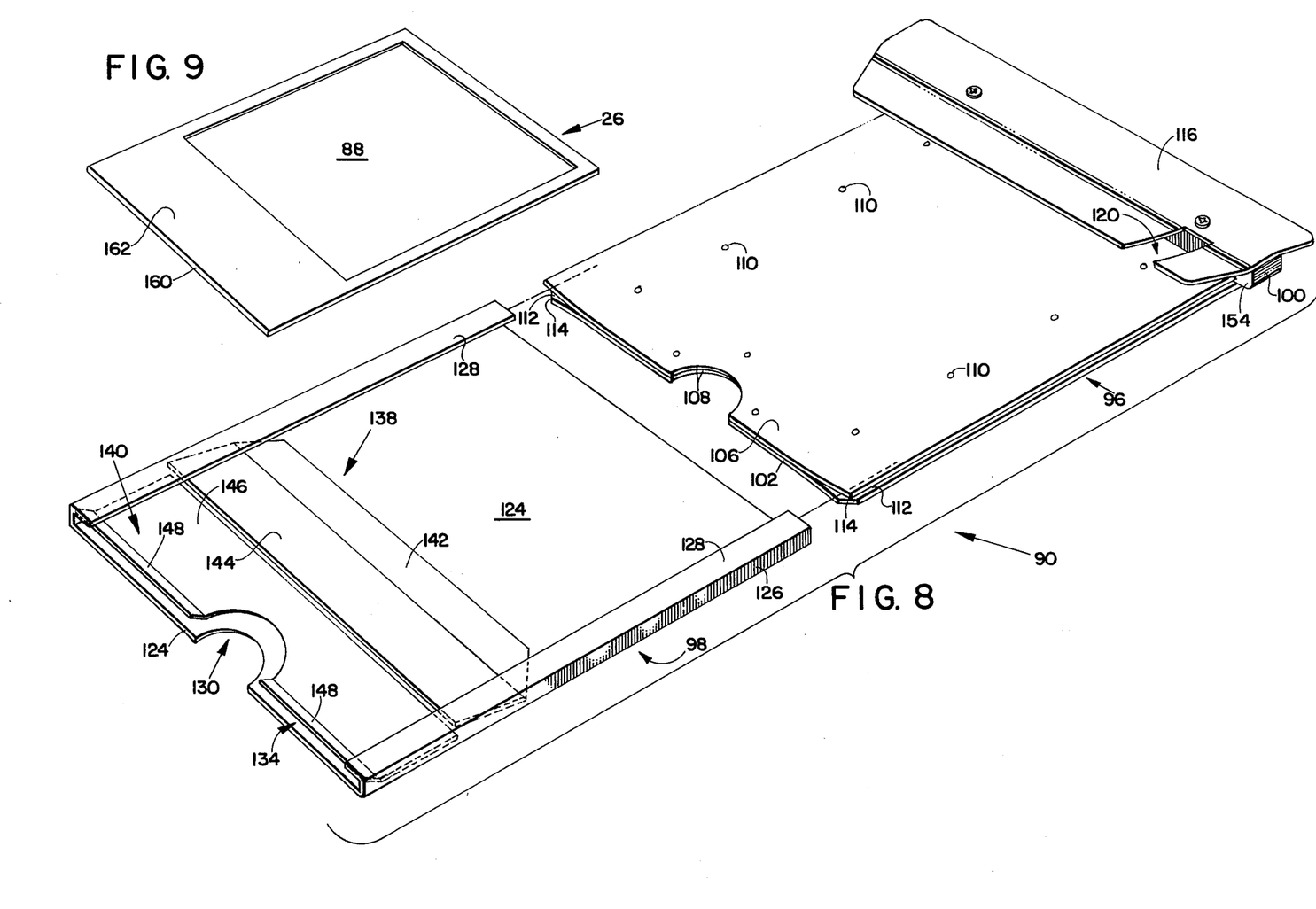
FIG. 8 is a perspective view, shown in exploded fashion, of the two major structural elements of the adapter.
FIG. 9 is a perspective view of a typical integral type of self-developing film unit that may be used in an SX-70 camera.

As noted earlier, certain self-developing film units 26 include a completely self-contained light opacification system. FIG. 9 shows a self-developing film unit 26 which includes a generally square photosensitive or image-forming area 88. In a reflection print film unit that includes an opacification system in the fluid processing composition, the photosensitive material is exposed through a transparent sheet or window which covers area 88. The opposite side of the emulsion is covered with an opaque backing sheet of the film unit.

Subsequent to exposure, the procession fluid is distributed between layers of the film unit in covering relation to the photosensitive materials. Therefore the film unit may be advanced through exit slot 68 to the exterior of the camera without further exposure. The short dark chamber 86 prevents light from traveling along the transparent cover sheet and causing exposure of that portion of the film unit that is behind the rollers and has not yet been covered by the processing fluid.

Therefore, the SX-70 camera, as shown in FIG. 1 (with the short dark chamber 86) may expose, process and eject (at least partially) a film unit 26 which includes a complete opacification system.

It is, however, desirable to be able to use the SX-70 camera with film units that do not include a complete opacification system or have any self-contained opacification system at all. These include a reflection print type which has an opaque sheet covering the bottom side of the photosensitive area 88 and an inadequate or no opacification system in the processing fluid. Also included are transparency film units which have no opacification system in the fluid and may or may not include a stripable opaque cover sheet on one side (opposite the exposure side) to prevent fogging of underlying film units when arranged in a stack in a film container 24.

To use film unit 26 which does not include a total self contained opacification system, a light shield or dark chamber extension must be provided at least for that portion of the photosensitive area 88 that extends outside of the dark chamber 86 when the film unit 26 has completely passed between rollers 58 and 60.

At a very minimum, the light shield must cover one side of the film unit that included an opaque backing sheet on the other side. For a transparency film unit with no backing sheet, both sides of the film unit must be protected.

In order to facilitate the use of such film units in the SX-70 camera and thereby adding versatility to the system, the present invention provides a simple, lightweight, and extremely thin dark chamber or light shield adapter 90 which may be readily coupled to and detached from an SX-70 camera without having to make any modifications thereto.

As best shown in FIGS. 2, 3, 4, 5, 6, 7, and 8 adapter 90 includes an adapter body defined by a very thin generally rectangular lighttight envelope or dark chamber 92 for receiving and light-shielding a film unit 26 and an upper portion 94 for releasably coupling adapter 90 to camera 10.

By opening the forward section 12 of camera 10, the user has access to the interior side of slot 68 (facing the rollers 58 and 60 and the interior of the camera housing) and the adapter 90 may be slidably inserted between the exit side of the rollers and the top edge 84 of baffle plate 66 and through the film exit slot 68 in the bottom wall 70 of housing section 12. When adapter 90 is fully inserted, a surface of portion 94 engages the top edge 84 of baffle plate 66 thereby releasably coupling adapter 90 to camera 10 and accurately positioning it with respect to the predetermined path of travel of the film unit 26 from the exit side of the rollers.

In a preferred embodiment, adapter 90 in constructed in two sections 96 and 98 as shown in FIG. 8.

Section 96 (See FIG. 5) includes a laterally extending generally parallelepiped shape base block 100 which may be formed of any suitable material such as stainless steel or plastic.

Extending forwardly from block 100 is a generally flat thin sheet 102 of preferably 0.010 inch stainless steel. Sheet 102 is generally rectangular and includes an upturned flange portion 104 at its trailing end to facilitate its attachment to the rear wall of block 100 by any suitable means such as screw, rivets, etc.

Positioned over sheet 102 is a second thin sheet of stainless steel 106 that is coextensive with that portion of sheet 102 extending forwardly of block 100. Unless otherwise stated, all of the sheet material used in the preferred illustrated embodiment of adapter 90 is 0.010 inch stainless steel but it will be understood that other materials may be used.

As best shown in FIG. 8, sheets 102 and 106 are generally rectangular and those portions thereof extending forwardly of block 100 are slightly larger than the outside dimensions of a film unit 26 shown in FIG. 9. Sheets 102 and 106 each include aligned semicircular cutouts 108 in the center of their respective leads ends to facilitate removal of a film unit 26 from dark chamber 92 following the short inbibition period.

In a preferred embodiment, sheet 106 is tack welded to sheet 102 at the locations 110 shown in FIG. 8. The intent is to join the sheets together at a short distance in from the lateral edges so as to form a pair of longitudinally extending channels 112 along the lateral margins of sheets 106 and 102 for slidably receiving adapter section 98 therein. The leading end corners 114 are preferably cut off at an angle to facilitate insertion.

Mounted on top of block 100 and extending forwardly and rearwardly thereof is a gently S shaped curved light shield 116 form of thin sheet stock. Laterally, shield 116 is dimensioned to fit snugly between the interior surfaces of the sidewalls 72 of the camera housing section 12. As best shown in FIG. 2, when the adapter 90 is located at its operative position shield 116 abuts the underside of housing section 20 and extends over the top roller 58 thereby serving to shield a light path to the film withdrawal slot 56 of container 24. Mounted on the left lateral end of shield 116 and depending behind block 100 is an auxiliary light shield 118 for shielding a light path around roller gear 62. Shield 118 is best shown on the right side of the back view of adapter 90 in FIG. 7. The leading edge of shield 118 includes a rectangular cut out 120 therein which provides clearance for a projection 122 extending outwardly from the top edge 84 of baffle 66. Projection 122 serves to reset the camera's trim control to a neutral position whenever the camera is folded and there is no operative cooperation between adapter 90 and projection 122.

Adapter section 98 is formed of a thin sheet of stainless steel and includes a generally rectangular bottom wall 124 a pair of upstanding short lateral side walls 126 each having a turned in flange 128 at the top edge thereof disposed in vertically spaced substantially parallel relation to bottom wall. The flanges 128 are adapted to be slidably inserted, in telescoping fashion into the longitudinal channels 112 on section 96 for the purpose of coupling sections 96 and 98 together.

Bottom wall 124 of section 98 is equal in length to sheet 106 of section 96 and section 98 is inserted into channels 112 until the leading edges of wall 124 and sheets 102 and 106 are aligned.

The leading edge of bottom wall 124 includes a semicircular cutout 130 that is adapted to be aligned with cutouts 108 in section 96.

Figure 7:
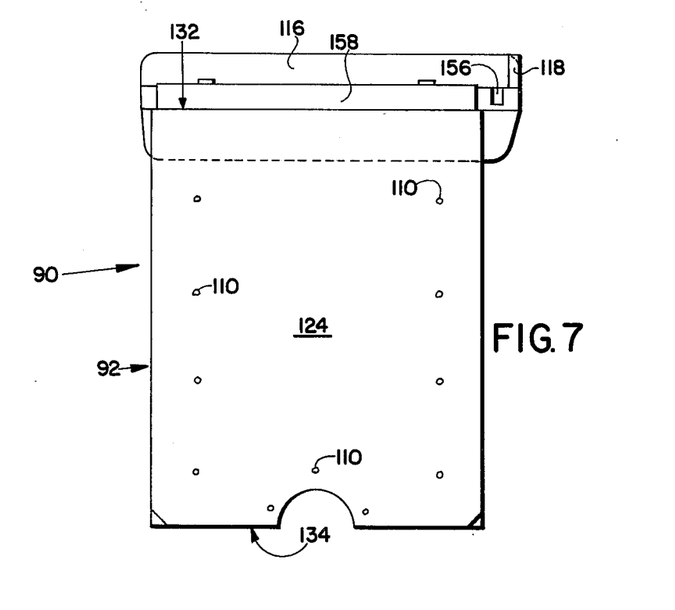
FIG. 7 is a rear plan view of the adapter shown in FIG. 4.

When section 98 is fully inserted in section 96, the two sections may be tack welded together or otherwise secured. Once assembled the underside of sheet 102, and the interior surfaces bottom wall 124 and side walls 126 cooperate to define a major portion of the dark chamber 92. As best shown in FIGS. 2, 7, and 8, the film receiving chamber 92 has an entrance opening 132 at the trailing end an exit opening 134 at the leading end and a central passageway 136 between openings 132 and 134.

In order to light seal the exit opening 134, adapter section 98 is provided with first and second resilient light shield members 138 and 140.

The first light shield 138 is located about one third of the way back from the leading edge of bottom wall 124 and includes a first section 142 which is secured to wall 124 in overlying relation to the interior surface thereof and a second section 144 which extends forwardly thereof and is inclined upwardly into abutting relation with the underside of flanges 128. Light shield section 144 extends between sidewalls 126 and may be formed of a very thin sheet spring steel or a thin sheet of resilient plastic such as opaque Mylar. Light shield section 144 blocks the central passageway 136 until its upper free end is deflected downwardly by the leading end of a film unit as it is advanced through chamber 92. The close proximity of the film unit to the interior surface walls forming the chamber generally is sufficient to maintain the light seal after shield section 144 has been deflected.

However, due to manufacturing variances, it is possible for some light to leak along the sides of adapter section 98. To prevent such a leak, the second light shield 140 is utilized. It includes a bottom section 146 secured to bottom wall 124 and an upwardly inclined forward section 148 which abuts the interior surfaces of sidewalls 126 and flanges 128. Section 148 is located near the leading edge of section 98 and is not deflected from its light blocking position when the film unit 24 is fully advanced into chamber 92. It is only deflected when the film unit is pulled out of the exit opening 134. Light shield 140 serves a dual purpose. It blocks light from the side channels formed by walls 126 and flanges 128 and it, along with light shield 138, helps to frictionally engage and hold the film unit in chamber 92 until it is removed by the user.

Figure 6:
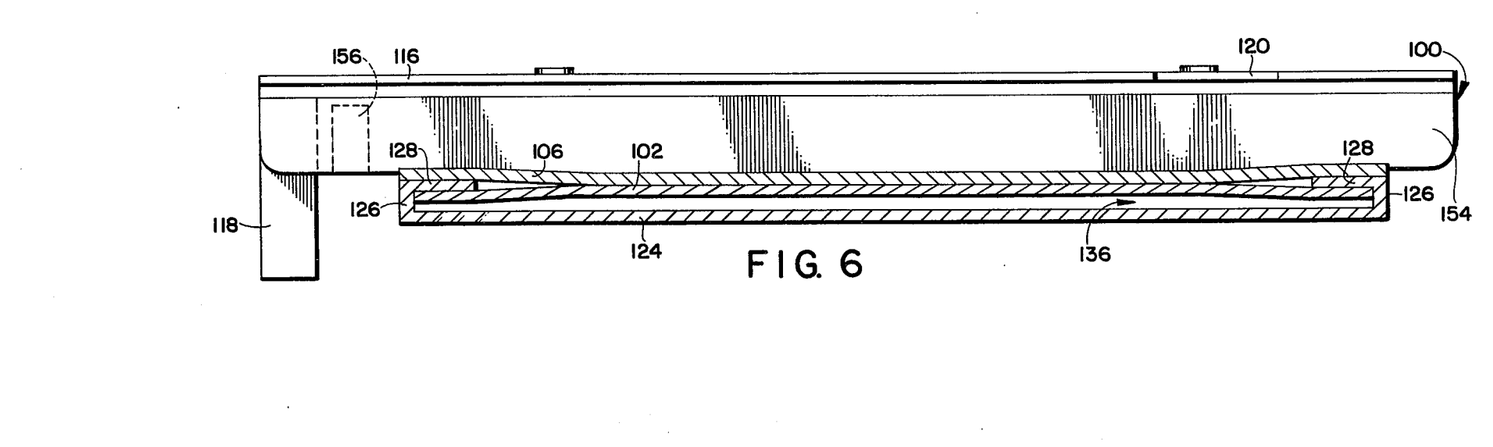
FIG. 6 is a lateral sectional view of the adapter of FIG. 5 taken along lines 6—6.

As best shown in FIG. 6, the dark chamber or light shielding portion 92 of adapter 90 is very thin. A typical self-developing film unit 24 that is adapted to be advanced through the central passageway 136 has a thickness of approximately 0.035 inch. The central passageway 136 has a vertical height dimension of approximately 0.036 to 0.040 inches. Since the adapter sections wall sections 124, 128, 102, and 106 are formed of 0.010 inch sheet stack, the overall thickness of adapter section 92 is approximately 0.076 to 0.080 inches.

It has been determined that 0.080 inch is about the maximum desirable thickness for section 92 so that it may be slidably inserted through the camera film exit slot 68 in the bottom wall 70 of camera section 12.

As best shown in FIG. 2 of the drawings, the film exit slot 68 is formed by a forwardly extending deflectable resilient U shaped flap or tongue 150 which is cut or stamped in bottom wall 70 of camera housing section 12. Flap 150 acts like a leaf spring and is normally in an almost totally closed position to act as a light shield for exit slot 68. As the film unit 26 is advanced through the short dark chamber 86, the leading edge of the film unit 26 engages flap 150 and deflects the free end thereof downwardly to further open slot 68 and allow the passage of the film unit 26 therethrough. When the forward momentum imparted to the film unit 26 by the rollers 58 and 60 diminishes, the spring action of flap 150 causes it to move upwardly and, in cooperation with portions of the leading edge of slot 68, frictionally engage and releasably retain the partially ejected film unit therebetween until it is removed by the user.

It has been found that dark chamber section 92 of adapter 90 having a maximum thickness of 0.080 inch may be easily inserted through and retracted from slot 68 without permanently deforming flap 150. In addition to possible permanent deformation of flap 150, it may be difficult to insert a thicker dark chamber section because of the insertion angle dictated by the angle of the erected baffle plate with respect to the bottom wall 70 and the spacing of its top edge 84 from the top roller 58. Any attempt to insert a thicker dark chamber section may result in distortion of or damage to baffle plate 66.

In operation, the camera housing section 12 is moved from the closed position of FIG. 1 to the open position of FIG. 3 by depressing a latch member 152 on housing section 14 and pivoting housing section 12 downwardly.

The user now has access to the interior side of film exit slot 68 and may insert the adapter 90, leading end first, between the top roller 58 and the top edge 84 of baffle plate 66 and then through the film exit slot. The adapter 90 is pushed through slot 68 until the forward planar surface 154 of adapter base block 100 comes into abutting engagement with the top edge 84 of baffle plate 68. The surface 154 serves two functions. First it serves to releasably couple adapter 90 to camera 10 and secondly it provides means for accurately positioning the adapter in operative relation with the camera, especially with respect to the film unit path of travel on the exit side of the rollers.

When adapter 90 is in the fully inserted position shown in FIG. 3, the light shield 116 extends over the top roller 58 and the light shield 118 is in covering relation to roller gear 62. A cutout section 156 is provided on the underside of block 100 to provide clearance for gear 62. Also, the exterior surface of sheet 106 is in underlying substantially parallel relationship to the interior surface of baffle plate 66 which normally serves as a light shield and film deflector for improving the uniformity of fluid distribution when adapter 90 is not used on camera 10.

With a film container 24 inserted in chamber 28, housing section 12 is pivoted upwardly to the closed position shown in FIG. 2. The exterior surface of light shield 116 abuts the underside of housing section 20 thereby light shielding any light leak path over or between rollers 58 and 60. Light leaks around gear 62 are blocked by the adapter element 118.

Referring to FIG. 2, it will be seen that when adapter 90 is operatively positioned on housing section 12, that section 158 of the underside of sheet 102 beneath block 100 extends rearwardly of the film entry opening 132 of dark chamber 92 and is inclined at an angle of approximately 45° with and intersects a film exit path of travel between rollers 58 and 60. As a film unit 26 is advanced between rollers 58 and 60, the leading edge 160 thereof engages inclined surface 158 and is deflected thereby into the film entry opening 132 of chamber 92. Thus surface 158 serves as a means for guiding the film unit into operative relation with adapter 90 and also serves to gently bend or deflect the film unit downwardly to cause the improvement in the uniformity of the fluid distribution within the film unit. The bending action is continued by the extension of surface 158 (the underside of sheet 102) within chamber 92. It will be noted that the underside of sheet 102 is disposed in substantially parallel relationship to the interior surface of baffle 66 which normally provides the film deflecting function when adapter 90 is not used.

In a preferred embodiment, the length of dark chamber 92 between the entrance of opening 132 and the exit opening 134 is approximately 4.25 inches. When the adapter 90 is fully inserted, that portion of dark chamber 92 extending outwardly beyond film exit slot measures approximately 2.875 inches.

Ambient light is prevented from traveling up central passageway 136 by light shield 138. As film unit 26 is advanced through chamber 92, the leading edge 160 thereof engages and deflects light-shield portion 144 and is advanced thereover. The proximity of the chamber wall to the film unit 26 for the most part maintains the light shielding action thereafter. Supplementary light shielding for the side channels is provided by light shield 140 as described earlier.

When film unit 26 is fully advanced into chamber 92, that is when the trailing edge of the film unit 26 has passed between rollers 58 and 60, the leading edge 160 of the film 24 is almost in alignment with leading edge of chamber 92. From FIG. 9 it will be seen that film unit 26 includes an opaque transverse margin 162 (overlying the depleted fluid container 42) which measures approximately 0.875 inch from leading edge 160 to the leading transverse edge of the photosensitive image forming area 88. The forward portion of this margin is accessible through the semicircular openings (extending rearwardly about 0.500 inch) in the leading edge of dark chamber 92. Thus the photosensitive portion 88 of the film unit is completely covered when the film unit is fully advanced into chamber 92 but the user has access to the opaque margin 162 for the purpose of pulling the film unit 24 out of chamber 92 following the required short imbibition period.

To remove the adapter 90, housing section 12 is pivoted to the open position and adapter 90 is grasped by the underside of that portion of light shield 116 extending forwardly of block 100 and is pulled upwardly. Thus adapter element 116 serves as both a light shield and a convenient handle for facilitating the insertion and withdrawal of adapter 90.

The illustrated and described embodiment of the dark chamber or light shielding adapter 90 adds versatility to the SX-70 camera by expanding the types of integral self-developing film unit that may be used therewith. It is compact and thin. It may be readily attached and detached without modification to commercially available SX-70 cameras. It provides protection for integral type self-developing film units which do not have a partial or complete opacification system. It is adapted to be inserted from the interior side of the film exit slot and therefore is less apt to be accidently displaced or knocked off the camera. In addition to light shielding at least that part of the photosensitive area of the film unit that extends outside of the film exit slot in the camera, it also deflects or gently bends the film unit from its normal path of travel on the exit side of the pressure-applying rollers to improve the uniformity of fluid distribution within the film unit.

The illustrated and described construction of adapter 90 is intended to provide a vehicle for presenting the basic concept of providing a very thin dark chamber or light shield which may be inserted through the film exit slot of an SX-70 camera from the interior side thereof. It will be understood that it is within the scope of the present invention to make substantial structural changes in the adapter while still retaining its functions. For example, an equivalent dark chamber may be constructed from a single sheet of material or fewer sheets of material than illustrated. The choice of material is optional as long as it is light opaque and the total thickness of the chamber or shield does not exceed 0.080 inch. While the illustrated dark chamber completely covers both sides of the photosensitive image forming area 88 of the film unit 24, it is within the scope of the present invention to provide a chamber or shield which covers only one side of area 88; or one or both sides of only that portion of area 88 that extends outside of the camera housing when film unit 26 has completely passed between the pressure applying rollers. While the illustrated adapter was shown to be releasably secured or coupled to baffle plate 66, it is also within the scope of the invention to provide means for releasably coupling the adapter to other structural elements of camera 10, for example the roller mounting bracket 76, etc.

Since certain changes may be made in the film unit dark chamber or light shield disclosed herein without departing from the scope of the invention herein involved, it is intended that all matter contained in the above description or shown in the accompanying drawings shall be interpreted as illustrative and not in a limiting sense.

What is claimed is:

1. A film unit light-shielding adapter that is configured to be removably coupled to a photographic apparatus of the type including a housing having a film exit slot therein and means for advancing a film unit along a predetermined path of travel within the housing and through the film exit slot such that at least a part of the film unit is located outside of the apparatus housing, the photographic apparatus also being of the type wherein a side of the film exit slot facing the interior of the housing is accessible to the user, said adapter comprising:

adapter means for operatively receiving a film unit that is advanced along the predetermined path of travel, said adapter means being configured to be readily inserted through the film exit slot, from the interior side thereof, such that a portion of said adapter means is located outside of the apparatus housing;

light blocking means, at least on said portion of said adapter means configured to be located outside of the apparatus housing, for blocking ambient light which otherwise may impinge upon photosensitive portions of that part of the film unit which is adapted to be located outside of the apparatus housing subsequent to the film unit having been advanced along the predetermined path of travel;

guide means on said adapter means for guiding a film unit, being advanced along the predetermined path of travel, into operative relationship with said adapter means; and means on said adapter means being releasably engagable with structure of the photographic apparatus for releasably coupling said adapter to the apparatus and for accurately positioning said adapter in operative relation with the apparatus so that said guide means is located in a predetermined relationship with the film unit path of travel.

2. The adapter of claim 1 wherein the predetermined path of travel of the film unit includes a curved portion thereof and said guide means includes means for engaging and deflecting the film unit from its normal path of travel so that it follows the curved portion of the predetermined path of travel.

3. The adapter as defined in claim 1 wherein said light blocking means includes a dark chamber for enclosing at least that portion of the photosensitive area of the film unit that is adapted to be located outside of the apparatus housing following advancement of the film unit along the predetermined path of travel.

4. The adapter as defined in claim 3 wherein said dark chamber is of thin construction and includes an internal passageway for receiving the film unit, a film entrance opening and a film exit opening and means for light shielding said film exit opening.

5. The adapter of claim 4 wherein the total thickness of said dark chamber does not exceed 0.080 inch.

6. The adapter of claim 1 further including means for light shielding light leak paths around apparatus structure that may lead to a film unit stored or being advanced therein.

7. A film unit light shielding adapter that is configured to be removably coupled to a self-developing camera of the type including pressure-applying means between which a self-developing film unit is adapted to be advanced to distribute a fluid processing composition within the film unit, a housing section extending forwardly of the pressure-applying means, a baffle plate mounted on the housing section forwardly of the pressure-applying means on a bottom wall of the housing section and extending laterally between side walls thereof and being mounted for movement between an inoperative position in overlying relation to the bottom wall and a normal operative position wherein the baffle plate is inclined with respect to the bottom wall and extends rearwardly towards the pressure-applying means so as to extend into the normal path of travel of a film unit emerging from the pressure-applying means for deflecting the film unit from its path of travel to improve the uniformity of fluid distribution within the film unit and for guiding the film unit to a film exit slot in the bottom wall of the housing section, the self-developing camera also being of the type wherein an interior side of the film exit slot, facing the interior of the housing section is accessible to the user, said adapter comprising:

an adapter body;

means on said adapter body defining a thin light excluding chamber for receiving a film unit as it is advanced from the pressure-applying means, said thin chamber including a film entry opening, a film exit opening, and an internal passageway for the film unit therebetween, said chamber being configured to be inserted between the pressure-applying means and the baffle plate and then at least partially through the film exit slot in the camera housing section such that a major portion of said chamber extends outside of said camera housing section;

guide means on said adapter body for guiding a film unit emerging from the pressure-applying means to the film entry opening of said chamber and for deflecting the film unit from its normal path of travel to improve the uniformity of fluid distribution within the film unit; and means on said adapter body being releasably engagable with structure of the self-developing camera for coupling said adapter to the camera and for accurately positioning said adapter in operative relation with the camera so that said guide means is located in a predetermined relationship with the film unit path of travel.

8. The adapter of claim 7 wherein said means being releasably engagable with structural of the camera includes means being engageable with the baffle plate.

9. The adapter of claim 7 wherein said means being engagable with the baffle plate includes a surface on said adapter body that is configured to be located in abutting relationship with a top free edge of the movably mounted baffle plate.

10. The adapter of claim 7 wherein said dark chamber has a total thickness which does not exceed 0.080 inch.

11. The adapter of claim 10 wherein the internal passageway of said chamber has a height which exceeds 0.035 inch.

12. The adapter of claim 7 further including means for light shielding light leak paths around and about the pressure applying means of the camera.

13. The adapter of claim 12 wherein said last mentioned means also serves as a handle for facilitating the mounting and removal of said adapter.

14. A film receiving and light-shielding accessory for a self-developing camera of the type including a pair of elongated processing rollers, a bracket rotatably mounting the processing rollers in juxtaposition to define a pressure generating gap therebetween, means for defining an elongated film exit offset with respect to the path a film unit would normally follow as it emerged from between the rollers, and a baffle plate having a top edge disposed on the opposite side of the pressure generating gap from the film exit, the baffle plate being configured to intercept the leading edge of the film unit as it emerges from between the rollers and to redirect it through the film exit, the film exit being located so that a major portion of the film unit extends therethrough when the trailing edge of the film unit emerges from between the rollers, said accessory comprising:

a first elongated structure having a substantially flat thin opaque section and an offset section disposed adjacent one end of said substantially flat thin opaque section; and a second substantially flat thin elongated structure connected in face-to-face relationship to said flat thin opaque section of said first elongated structure to define therebetween a light-tight chamber for receiving at least a major section of the photosensitive portion of the film unit, said light-tight chamber having an opening adjacent the other end of said substantially flat thin opaque section of said first elongated structure through which the film unit may be manually withdrawn from said light-tight chamber, the end of said accessory opposite said one end of said flat thin opaque section of said first elongated structure being configured to be slidably inserted between the rollers and the top edge of the baffle plate and then through the film exit with said second substantially flat thin opaque elongated structure facing away from the baffle plate, said offset section of said first elongated structure being configured to automatically engage structure of said camera as the end of said accessory opposite thereto moves exteriorly of said film exit to operably position said accessory on the camera with said substantially flat thin opaque section of said first elongated structure extending closely adjacent the baffle plate, the end of said second elongated structure opposite said withdrawal opening of said chamber terminating at a position below the path the film unit normally follows as it emerges from between the rollers when said accessory is operably positioned on the camera to cooperate with said first elongated structure to define another opening through which the film unit will automatically enter said chamber as it emerges from between the rollers.

15. The accessory of claim 14 wherein said offset section of said first elongated structure is configured to extend back over the top edge of the baffle plate to thus automatically engage the top edge of the baffle plate, as said accessory is slidably inserted through the camera's film exit, to operably locate said accessory on the camera.

* * * * *